United States Patent [19]
Firstenberg

[11] 3,834,771
[45] Sept. 10, 1974

[54] TRACK LAYING ATTACHMENT TO WHEELS HAVING PROTRUDING HUBS

[76] Inventor: Harold S. Firstenberg, 131 Townsend St., Redwood City, Calif. 94107

[22] Filed: Nov. 7, 1973

[21] Appl. No.: 413,443

[52] U.S. Cl. .................................. 305/25, 180/9.62
[51] Int. Cl. ............................................ B62d 55/04
[58] Field of Search .................... 180/5 A, 9.5, 9.62; 305/25

[56] References Cited
UNITED STATES PATENTS

| 1,449,036 | 3/1923 | Feden | 180/5 A |
| 3,590,935 | 7/1971 | Celia | 180/9.5 |
| 3,698,123 | 9/1972 | Barbieri | 180/9.5 |

FOREIGN PATENTS OR APPLICATIONS

| 818,976 | 8/1959 | Great Britain | 305/35 |
| 190,576 | 7/1937 | Switzerland | 305/25 |

*Primary Examiner*—Richard J. Johnson
*Attorney, Agent, or Firm*—Julian Caplan

[57] ABSTRACT

The wheels of certain vehicles, particularly those having 4-wheel drive, have hubs protruding axially. A track laying attachment for such vehicle replaces the wheel. The attachment comprises an inner part and an outer part. The inner part has a socketed hub shaped to fit against and be attached to the drive face of the wheel. An inner sleeve is welded to the hub in axial alignment therewith and carries a plug at its outer end. The outer part is installed over the inner part. It has a second sleeve dimensioned to fit outside the inner sleeve and has at its inner end an inner disk which fits flush against the hub. At the outer end of second sleeve is provided a collar which fits into the inner sleeve and abuts the plug and is detachably connected to the plug to hold the two parts assembled. The outer part also has an outer disk detachably connected to the collar. Inner and outer drive sprockets are attached to the inner and outer disks. Supporting the second sleeve and spaced therefrom by bearings is an outer sleeve bearing housing which is secured to a frame. The frame has appropriate bogie wheels and idler wheels at the ends of the track. The track fits around the inner and outer sprockets as well as the idler and bogie wheels and supports the vehicle. As the driving face turns, the track is driven.

8 Claims, 3 Drawing Figures

TRACK LAYING ATTACHMENT TO WHEELS HAVING PROTRUDING HUBS

This invention relates to a new and improved track laying attachment for vehicles having wheels with protruding hubs. More particularly, the invention relates to an attachment for a wheel for a two or four wheel vehicle which is supported by endless track to enable the vehicle to travel over rough ground, snow, sand and other difficult terrain. The attachment preferably replaces the conventional wheels and is removable so that the wheels and track laying attachment are interchangeable. The present invention has particular reference to a structure which may be attached to a variety of wheel mountings particularly for 4-wheel drive vehicles. These mountings are characterized by axial protuberances from the driving face.

One of the features of the invention is the fact that access is provided in the assembly to fasten the attachment with conventional lug bolts or lug nuts to the driving face of the wheel without modification of the same. This feature makes it possible to reinstall the original wheels when the track laying attachment is not needed, without modification.

Another principal feature is the fact that the attachment has two parts, the inner part being first attached to the wheel drive face and the outer part being slipped over the inner and attached thereto. The two-part assembly concept allows the device to be adapted to a wide variety of vehicle configuarations, such as different bolt and bolt circle sizes and different shapes of low-friction drives which are received in a weather-proof enclosure. The adaptation requires merely modifying the inner part without changing the outer part.

Another feature of the invention is the provision of a strong support for the track with one drive sprocket close to or inward of the driving face and another sprocket spaced outwardly of the driving face a considerable distance to augment the tread width of the track. This results in a wide overall "foot-print" of the vehicle and makes it more stable.

A feature of the invention is the fact that it is relatively inexpensive to fabricate in that conventional parts which are commercially available are used throughout the assembly and the amount of fabrication required is slight.

Other features of the invention are that the bearings are totally enclosed and sealed and protected from contamination of terrain and elements, as contrasted with prior drives; that the assembly consists of two sections which are conveniently put together, and that the device handles heavy loads and accommodates considerable side thrust.

Other objects of the present invention will become apparent upon reading the following specification and referring to the accompanying drawings in which similar characters of reference represent corresponding parts in each of the several views.

Figure 1:
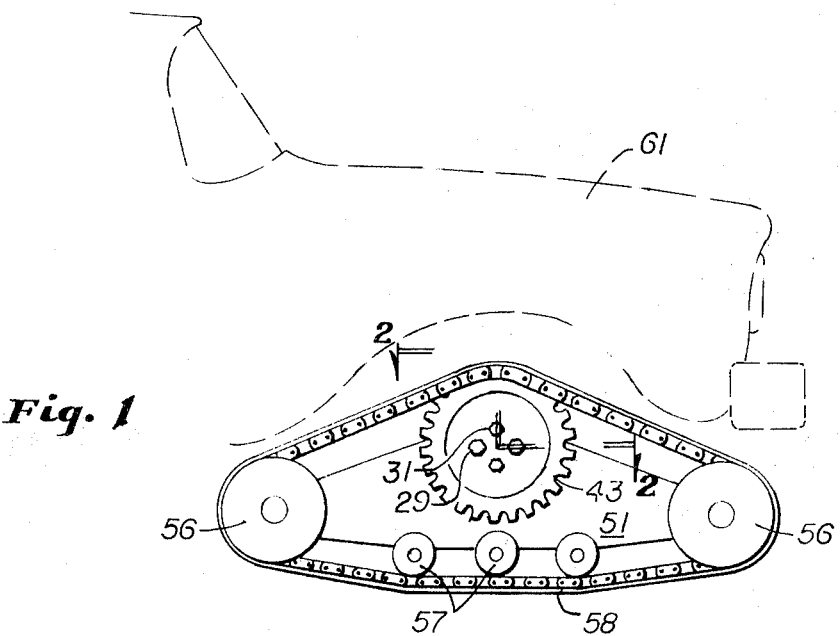
FIG. 1 is a schematic side elevational view of a portion of a vehicle showing the attachment of this invention installed.
Figure 2:
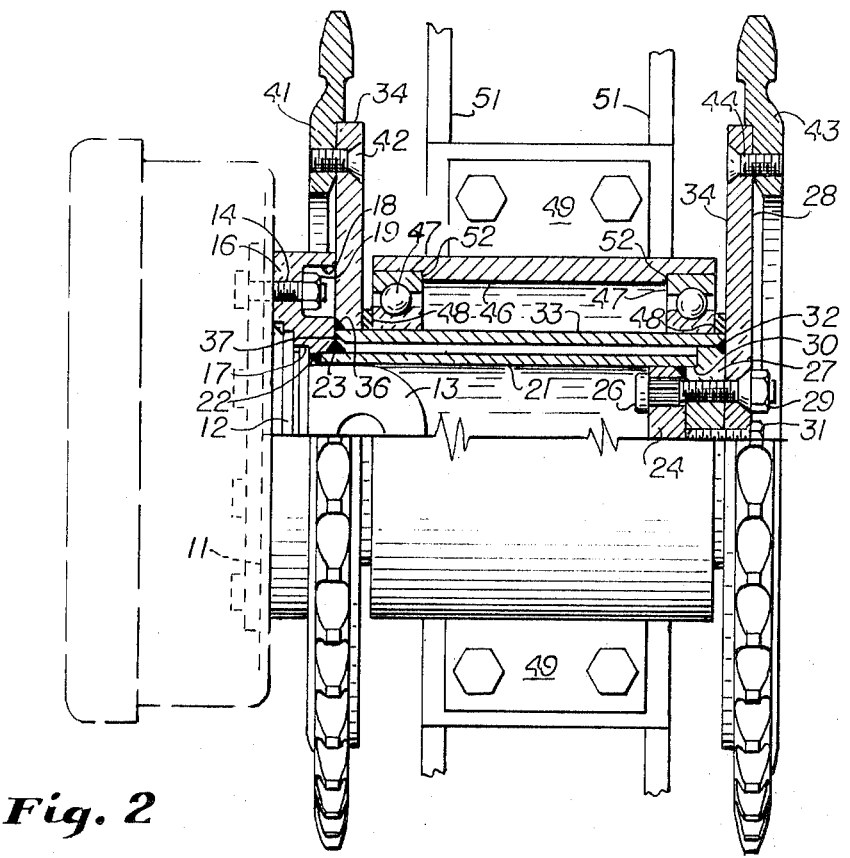
FIG. 2 is an enlarged plan view along line 2—2 of FIG. 1 of a portion of the structure, the view being partially broken away to reveal internal construction.

In the accompanying drawings a conventional driving face 11 is illustrated schematically, it being understood that one of the features of the present invention is the fact that it will fit on to a variety of models of such assembly. Particularly, 4-wheel drive wheel assemblies have axial protuberances 12 of a variety of shapes and, as illustrated herein, at the outer end of protuberance 12 is a projecting ear 13 which is used to lift the vehicle by means of a sling. It will be understood that the exact shape of the protuberance 12 and ear 13 is incidental to the present invention, but the presence of these protuberances constitutes a problem in attaching the track laying attachment which the present invention solves.

Hub 16 is provided formed with a socket 17 which is either complementary to the protuberances 12 or is of a shape which will fit a variety of such protuberances. The hub 16 is formed with counterbored holes 18 which mate with the lug bolts 14 protruding from the driving face 11 and accommodate lug nuts 19 which secure hub 16 to the driving face 11 with a secure flush fit. It will be understood, of course, that the lug nuts may be replaced by the lug bolts to fit into holes in the driving face assembly 11, depending upon the vehicle manufacturer's preference. One of the features of the invention is the fact that the hub 16 is shaped to accommodate protuberance 12 and is annular so that additional protuberances such as ear 13 will fit through the hub 16.

Inner sleeve 21 is fixed to hub 16 by means of inner and outer welds 22, 23 and since the sleeve 21 is hollow it accommodates ear 13 or other axial protuberance 12 of the face 11. Sleeve 21 is preferably of extended length to provide good outboard support for the track hereinafter described. Adjacent its outer end is a plug 24 welded to the interior thereof in which are mounted outward extending lug bolts 26.

Collar 27 is formed with a shoulder 30 which fits inside the outer end of sleeve 21 outward of plug 24 and is fastened to plug 24 by lug nuts 29 on bolts 26 fixed to plug 24. Outer disk or adapter 28 is fastened to collar 27 by means of screws 31. Second sleeve 33 is welded to collar 27 by means of weld 32, sleeve 33 being coaxial with sleeve 21 and spaced slightly outwardly thereof. Inner disk 34 is welded by means of weld 36 to the inner end of sleeve 33, the inner end of sleeve 33 being formed with a chamfer 37 to accommodate weld 23. Inner annular sprocket 41 fits over the outside of hub 16 on the inside of disk 34 and is detachably secured by means of screws 42. Outer annular sprocket 43 is secured to disk 28 by means of screws 44.

Fitting around the outside of sleeve 33 is outer sleeve 46 which functions as a bearing housing and mounting and is spaced from sleeve 33 by inner and outer sealed, thrust ball or roller bearings 47 and is spaced from disks 34 and 28 by inner and outer spacer washers 48 which facilitate disassembly and accommodate machining irregularities. Outer sleeve 46 is formed with counterbores at either end and bearings seat against the shoulders 52 at the inner ends of these counterbores. Diametrically opposed ears 49 are formed on sleeve 46 and suitably apertured so that the mounting 46 may be fastened to a substantially triangular frame 51. Idler wheels 56 are mounted at the forward and rearward ends of the bottom of frame 51 whereas inner and outer sprockets 41, 43 are mounted at the top or center of frame 51. Preferably, a plurality of track bogies 57 are rotatably mounted to the bottom edge of frame 51. It will be understood that the construction of frame 51 and the choice and location of wheels 56 and bogies 57 is subject to considerable variation. Around sprockets 41, 43 as well as idler wheels 56 is an endless track 58 of considerable tread width. The bogies 57 elevate the frame 51 above the bottom stretch of track 58. As the driving face 11 is turned, the sprockets 41, 43 drive the track 58 which also functions to support one corner of the vehicle 61. Appropriate belt tightening means (not shown) is provided.

Figure 3:
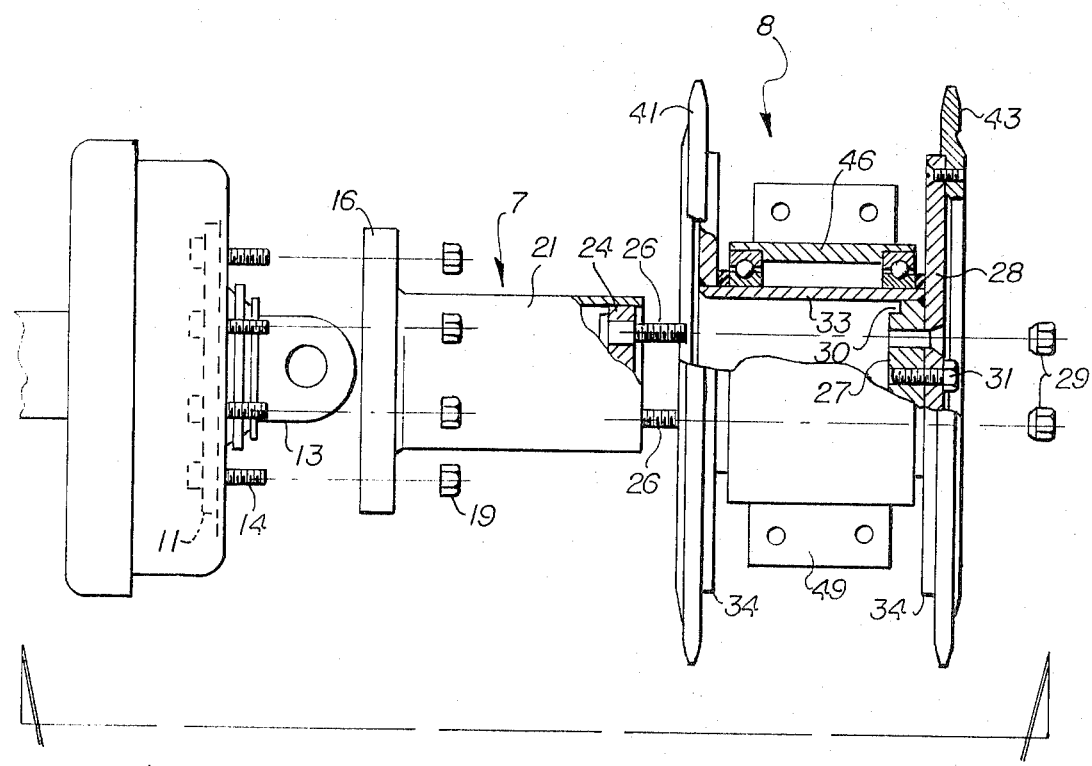
FIG. 3 is an exploded view illustrating the sequential assembly of the inner part to the drive face of the wheel and the outer part to the inner part.

The attachment consists essentially of inner part 7 and outer part 8, as best shown in FIG. 3. The inner part 7 consisting of hub 16, inner sleeve 21 and plug 24 is first attached to drive face 11 by lug bolts 14 and nuts 19. Hub 16 is selected of a shape to fit over protuberance 12 and optional ear 13 and holes 18 are located to receive bolts 14.

The outer part 8 is more complex and after the outer part is assembled it merely attaches to part 7 by means of lug bolts 26 and nuts 29. Second sleeve 33 is welded to inner disk 34 by weld 36 and the inner end of sleeve 33 is machined to a proper chamfer 37 to fit snug against weld 23. Collar 27 is welded to sleeve 33 by weld 32 and shaped so that in the final assembly it fits into the open end of sleeve 21 with shoulder 30 snug against the end of sleeve 21 and collar 27 secure against plug 24. The outer part 8 is sub-assembled by installing inner spacer 48 over sleeve 33, then inner bearing 47, then outer sleeve 46, then outer bearing 47, and then outer spacer 48. Thereupon outer disk 28 is fixed to collar 27 by means of screws 31 and the subassembly is tight and secure. To complete outer part 8, inner sprocket 41 is secured to disk 34 by screws 42 and outer sprocket 43 to disk 28 by screws 44. Belt 58 is mounted around sprockets 41 and 43 and also around idlers 56 and bogie wheels 57 and tightened in position by an appropriate tightening device (not shown).

Thus each of the two parts 7 and 8 is a separate subassembly. The final assembly is made by first attaching hub 16 to face 11 and then slipping second sleeve 33 over inner sleeve 21. Lug nuts 29 are tightened on lug bolts 26 to hold the two parts 7 and 8 together.

What is claimed is:

1. In a track-laying structure for a vehicle wheel of the type having a drive face with an elongated axial protuberance and provided with first connecting means, an attachment comprising a first part having a hub formed with a socket shaped to accept said protuberance and apertured for second connecting means cooperable with said first connecting means to attach said hub to said drive face, an inner sleeve fixed at its inner end to said hub and dimensioned to accept said protuberance, and third connecting means at the outer end of said inner sleeve; and a second part having a second sleeve shaped to fit over said inner sleeve, hub-engaging means on the inner end of said second sleeve, fourth connecting means on the outer end of said second sleeve cooperable with said third connecting means to hold said two parts together and having an outer face, inner track driving means connected to said hub-engaging means, outer track driving means connected to said fourth connecting means, an outer sleeve outside said second sleeve, bearing means between said second and outer sleeves totally enclosed by said outer sleeve, and mounting means for mounting said outer sleeve on a support, said attachment supporting the weight of the vehicle to which it is attached, as well as side thrust occurring during movement of said vehicle.

2. A track laying structure, according to claim 1, in which said second part further comprises a frame having a support for said mounting means, said track driving means extending beyond the top of said frame, forward and rear track-engaging rollers on said frame, and an endless track around said track driving means and said rollers.

3. A structure, according to claim 2, in which said track driving means comprises sprocket wheels.

4. A structure, according to claim 2, in which said frame is substantially triangular in side elevation with said rollers at either end of the base and said track driving means at the apex of the triangle of said base and which further comprises a plurality of bogie wheels on said base supporting said base above the bottom stretch of said track.

5. A structure, according to claim 1, in which said third connecting means comprises a plug fixed adjacent the outer end of said inner sleeve and said fourth connecting means comprises a collar fixed to the outer end of said second sleeve and shaped to fit into the outer end of said inner sleeve to abut said plug and which further comprises fastening means for detachably fastening said plug and collar together.

6. A structure, according to claim 5, in which said fourth connecting means further comprises a disk and second fastening means for detachably connecting said disk to said collar and said outer track driving means is connected to said disk.

7. A structure, according to claim 1, in which said inner track driving means is annular and fits around said hub and said hub-engaging means is an annular disk of lesser outside diameter than said inner track driving means fixed to the inner end of said second sleeve and fitting flush against the outside of said hub.

8. A structure, according to claim 1, in which said bearing means are sealed thrust-type bearings having inner and outer races and which further comprises means for transmitting side thrust of both said track driving means and vehicle weight to said inner races.

* * * * *